United States Patent [19]
Gruber et al.

[11] Patent Number: 5,739,999
[45] Date of Patent: Apr. 14, 1998

[54] CURRENT LIMITING CIRCUIT

[75] Inventors: Patricia Lynn Gruber, Morris Township, Morris County; David Stevens Kerr, Morris Plains; Roman Ostapiak, Pine Brook, all of N.J.

[73] Assignee: Lucent Technologies Inc., Murray Hill, N.J.

[21] Appl. No.: 692,249

[22] Filed: Aug. 5, 1996

[51] Int. Cl.$^6$ ..................................... H72H 9/00
[52] U.S. Cl. .................. 361/56; 361/106; 361/119
[58] Field of Search .......................... 361/56, 57, 58, 361/59, 60, 86, 87, 88, 89, 93, 92, 94, 103, 106, 111, 119; 337/73; 379/2

[56] References Cited

U.S. PATENT DOCUMENTS 4,856,059  8/1989  Halbig ........................ 361/106

Primary Examiner—Jeffrey A. Gaffin
Assistant Examiner—Ronald W. Leja

[57] ABSTRACT

A current limiting circuit for use in broadband and combined broadband and telecommunications networks is described. A current limiting element is triggered into a high impedance state in the event of excess current on the line. A sensing element detects the resulting decrease in voltage and operates a switch which disconnects the current limiting element. Timing circuitry reconnects the current limiting element a predetermined period of time after the current limiting element returns to its low impedance state.

9 Claims, 2 Drawing Sheets

CURRENT LIMITING CIRCUIT

FIELD OF THE INVENTION

This invention relates to a current limiting circuit for use primarily in Broadband and combined Broadband and Telephony Networks.

BACKGROUND OF THE INVENTION

In telephony and Broadband (e.g., cable TV and interactive video) transmission systems, it is important to protect the subscriber and his or her equipment from excess currents which can be delivered if there is a short circuit somewhere in the system. In many cable TV systems and in some proposed combination cable and telecommunications systems, a positive temperature coefficient (PTC) resistor is used. Such a resistor will automatically increase its resistance in the event of excess current, thereby limiting the current which is delivered to the subscriber. While such resistors are effective, once they are triggered into the higher resistance state, they must be reset to their normal operating condition. Since the resistors are usually mounted in a tap on a telephone pole, physical access is limited.

Consequently, it is desirable to provide a current limiting circuit which can be automatically reset to its normal operating state once the excess current condition has been removed.

U.S. Pat. No. 4,577,221 issued to Skinner, Sr. et al describes a cable TV system where power is supplied by the subscriber, and an apparatus is proposed to turn off the power in the event that the drop cable from the tap is cut or disconnected. A relay control circuit senses the presence or absence of a special signal transmitted from the tap. In the absence of the signal, power is turned off by a relay. Once the drop cable is reconnected, the signal will again be detected, and the relay will be re-energized to supply power to the tap. U.S. Pat. No. 5,153,808 issued to Juntunen et al describes a data transmission network where power is turned off in the event measured voltages, line impedance, or both, fall outside a predetermined range. The voltage is sensed by resistors, and the power is turned off by a relay. It does not appear that the circuit is automatically restored to it normal operating condition.

SUMMARY OF THE INVENTION

The invention, in accordance with one aspect, is a circuit for re-setting a current limiting element to a low impedance state after said element has been triggered into a high impedance state. The circuit includes means connectable to the current limiting element for sensing voltage from the element. Switching means is connected to the sensing means so as to disconnect the current limiting element from a load in response to an indication of a low voltage state. A timing element is also coupled to the switching means so as to reconnect the load to the current limiting element after a predetermined period of time when the current limiting element returns to a high voltage.

BRIEF DESCRIPTION OF THE FIGURES

These and other features of the invention are delineated in detail in the following description. In the drawing.

It will be appreciated that, for purposes of illustration, these figures are not necessarily drawn to scale.

DETAILED DESCRIPTION

Figure 1:
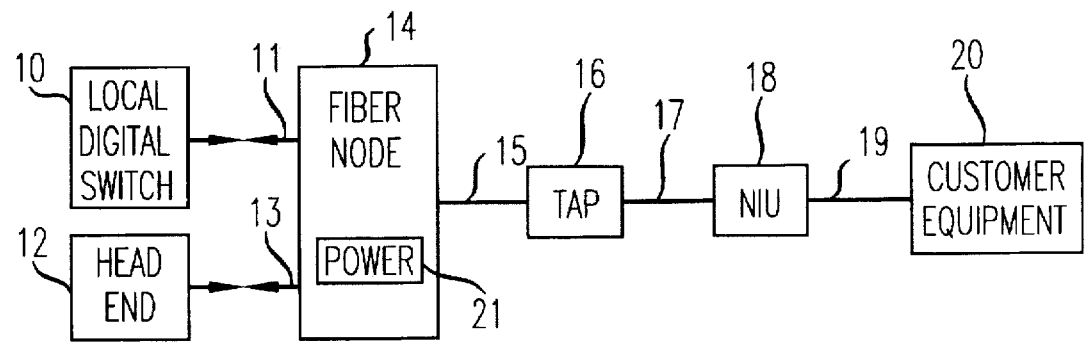
FIG. 1 is a block diagram of a system which can incorporate the present invention.

Referring now to the drawings, in which like reference numerals identify similar or identical elements, FIG. 1 illustrates a system which may employ the invention. Information in the form of voice and data originates from a local digital switch (LDS), 10, while a traditional head end, 12, provides standard cable TV signals. The head end, 12, can be separate from the local digital switch, as shown, or may be incorporated therewith. The signals are carried over bidirectional optical fiber links, 11 and 13, to fiber nodes, one of which is shown as 14, where transmission is converted to coaxial cables, e.g., 15. The fiber node, 14, also includes a source of power, 21, for the components of the system. The coaxial cables, 15, which transmit both information and power, are coupled to corresponding subscriber taps, one of which is shown as 16. Each tap is typically mounted on a pedestal or on a telephone pole in the vicinity of a plurality of subscribers. Signals are tapped off the cable, 15, and delivered by means of a drop coaxial cable, 17, to a network interface unit (NIU), 18, which is typically mounted on the side of a subscriber's house. A coaxial jumper cable, 19, carries TV signals to the customer equipment, 20, inside the house. The equipment can be in the form of a TV, computer, or telephone. Typically, the TV signals would be delivered by the cables, 17 and 19, while voice and data would be delivered by twisted wire pairs (not shown).

Figure 2:
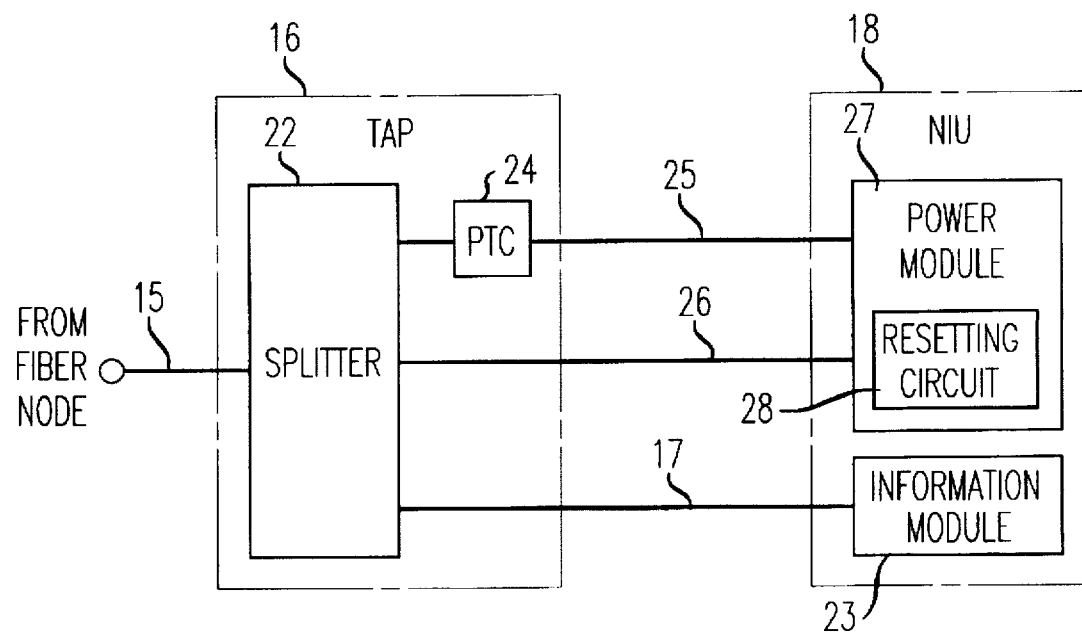
FIG. 2 is a block diagram of a portion of the system of FIG. 1 illustrating features in accordance with an embodiment of the invention.

FIG. 2 illustrates a portion of the system of FIG. 1 in more detail. Signals from the cable, 15, are coupled to a splitter, 22, where the information and the power signals are separated. Information signals are delivered by cable 17 to an information module, 23, at the NIU, 18. The power signals are coupled to a current limiting element, such as a standard positive temperature coefficient (PTC) resistor, 24 located at the NIU. One example of such a resistor is that sold by Raychem under the designation POLYSWITCH®. The power signals are then coupled by means of a wire pair, 25 and 26, to a power module, 27, located at the NIU, 18. The power module, 27, includes a resetting circuit, 28, which is illustrated in more detail in FIG. 3.

Figure 3:
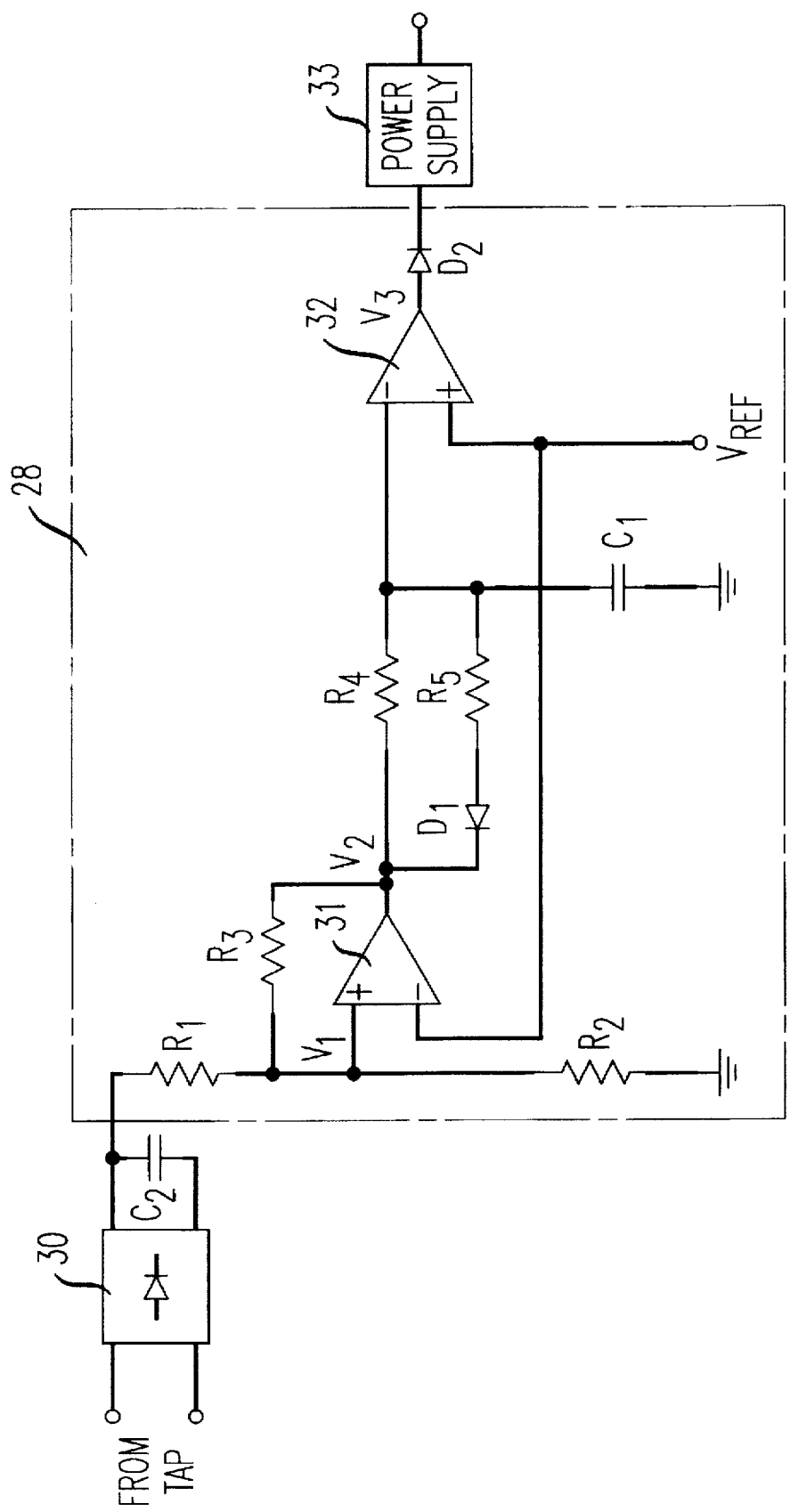
FIG. 3 is a schematic circuit diagram of a circuit in accordance with the same embodiment.

Turning now to FIG. 3, the PTC is first coupled to a bridge circuit, 30, at the NIU, 18, in order to rectify the signal therefrom. A capacitor, $C_2$ is coupled across the output of the bridge circuit in order to smooth out the output signal. The rectified signal is coupled through a voltage divider circuit comprising resistors $R_1$ and $R_2$ to a voltage detecting element, 31, which in this example is a comparator. The signal is coupled to the non-inverting (+) input of the comparator, while the inverting input (−) is coupled to a reference voltage, $V_{ref}$. The output of the comparator is coupled to a standard feedback resistor, $R_3$, which provides hysteresis and to another resistor, $R_4$, whose output is coupled to one end of a further resistor, $R_5$. The other end of resistor, $R_5$ is coupled to the anode of a diode, $D_1$, whose cathode is coupled to the output of the comparator. The resistor, $R_4$ is also coupled to one plate of a capacitor, $C_1$, whose other plate is grounded. The resistor, $R_4$ is further coupled to the inverting (−) input of a second comparator, 32. The non-inverting (+) input of the second comparator is coupled to the reference potential, $V_{ref}$. The output of the comparator, 32, is coupled through a second diode, $D_2$, to a power supply, 33, which supplies power to the electronics in the NIU.

In operation, if the PTC resistor, 24, experiences a high current, for example, due to a fault in the drop cable or the NIU, its resistance will increase, thereby reducing the current and voltage to the NIU, 18. This, in turn, results in a decreased voltage, $V_1$, at the non-inverting input of the comparator, 31. When the voltage, $V_1$, falls below a threshold value determined by the reference voltage, $V_{ref}$, the voltage, $V_2$, at the output of the comparator will also drop to zero. In a typical example, $V_{ref}$ would be 5.6 volts, $R_1$ would be 511K ohms, and $R_2$ would be 82K ohms, so that the threshold would be 4.85 volts. Since the output of the first comparator, 31, is coupled to the inverting input of the second comparator, 32, the voltage, $V_3$, at the output of the second comparator will increase above a second threshold value, e.g., 5.6 volts, which is sufficient to disable the power supply, 33. Thus, the comparator, 32, acts like a switch to cut off all power to the NIU. Diode $D_2$ will block any current in the reverse direction from the power supply, 33, while in the off state.

When the fault clears and with the power to the NIU cut off, the PTC resistor will not be powered since the NIU will no longer draw current from the PTC resistor, and, consequently, the resistor will have a chance to "cool down" to the point that it returns to its normal operating resistance. As the resistor cools down, the voltage to the resetting circuit, 28, will increase. When the voltage, $V_1$ reaches a third threshold, which is typically greater than the first threshold due to hysterisis, and in this example is 6.35 volts, the comparator output voltage, $V_2$, will increase and charge the capacitor, $C_1$, through resistor, $R_4$. The charging of the capacitor, $C_1$, will introduce a delay, typically, approx 5 sec, in the application of an increased voltage to the input of the second comparator, 32. Once that increased voltage is greater than the reference voltage, $V_{ref}$ the output voltage, $V_3$, will decrease below a fourth threshold, in this example, 5.6 volts, which enables the power supply, 33. The system will then operate in a normal mode until the PTC resistor is once again triggered to a higher resistance. The resistor, $R_5$ and diode, $D_1$ will quickly discharge the capacitor, $C_1$, to provide a fast reset for the circuit.

The invention claimed is:

1. A circuit for re-setting a current limiting element to a low impedance state after said element has been triggered into a high impedance state comprising:

a voltage sensing element connectable to the current limiting element for sensing voltage from the current limiting element;

a switch coupled to the sensing element so as to disconnect the current limiting element from power in response to an indication of a low voltage state; and a timing element coupled to the switch so as to reconnect the current limiting element a predetermined period of time after the current limiting element returns to a low impedance state.

2. A circuit for providing power to a customer in a network comprising:

a current limiting element coupled to a source of electrical potential;

a voltage sensing element coupled to the current limiting element for sensing voltage from the current limiting element;

a switch coupled to the sensing element so as to disconnect the current limiting element from power in response to an indication of a low voltage state; and a timing element coupled to the switch so as to reconnect the current limiting element during a predetermined period of time after the current limiting element returns to a low impedance state after having been in a high impedance state.

3. The circuit according to claims 1 or 2 wherein the current limiting element is a positive temperature coefficient resistor.

4. The circuit according to claims 1 or 2 wherein the the switch is a comparator having one input coupled to an output of the voltage sensing element.

5. The circuit according to claims 1 or 2 wherein the voltage sensing element is a comparator having an input connectable to the current limiting element.

6. The circuit according to claims 1 or 2 wherein the timing element comprises a capacitor which is charged by the voltage sensing element.

7. A circuit for providing power to a customer in a network comprising:

a current limiting element coupled to a source of electrical potential, the current limiting element being located in a subscriber tap;

a voltage sensing element coupled to the current limiting element for sensing voltage from the current limiting element, the voltage sensing element being located in a network interface unit remote from the tap;

a switch coupled to the sensing element so as to disconnect the current limiting element from power in response to an indication of a low voltage state, the switch being located in said network interface unit remote from the tap; and a timing element coupled to the switch so as to reconnect the current limiting element during a predetermined period of time after the current limiting element returns to a low impedance state after having been in a high impedance state, the timing element being located in said network interface unit remote from the tap.

8. A circuit for re-setting a current limiting element to a low impedance state after said element has been triggered into a high impedance state comprising:

a voltage sensing element connectable to the current limiting element for sensing voltage from the current limiting element, the voltage sensing element comprising a first comparator having a non-inverting input coupled to the current limiting element and a non-inverting input coupled to a reference voltage;

a switch coupled to the sensing element so as to disconnect the current limiting element from power in response to an indication of a low voltage state, the switch comprising a second comparator having an inverting input coupled to the output of the first comparator; and a timing element coupled to the switch so as to reconnect the current limiting element a predetermined period of time after the current limiting element returns to a low impedance state, the timing element comprising a combination of resistor and capacitor coupled to the output of the first comparator.

9. A circuit for providing power to a customer in a network comprising:

a current limiting element coupled to a source of electrical potential;

a voltage sensing element coupled to the current limiting element for sensing voltage from the current limiting element, the voltage sensing element comprising a first comparator having a non-inverting input coupled to the current limiting element and a non-inverting input coupled to a reference voltage;

a switch coupled to the sensing element so as to disconnect the current limiting element from power in response to an indication of a low voltage state, the switch comprising a second comparator having an inverting input coupled to the output of the first comparator; and a timing element coupled to the switch so as to reconnect the current limiting element during a predetermined period of time after the current limiting element returns to a low impedance state after having been in a high impedance state, the timing element comprising a combination of resistor and capacitor coupled to the output of the first comparator.

* * * * *